(12) United States Patent
Wojdyla et al.

(10) Patent No.: US 10,967,823 B2
(45) Date of Patent: Apr. 6, 2021

(54) RADIATOR STONE IMPACT PROTECTIVE GUARD

(71) Applicant: DENSO International America, Inc., Southfield, MI (US)

(72) Inventors: Michael Wojdyla, Warren, MI (US); Michael Lacey, Allen Park, MI (US); Shane Harte, Novi, MI (US)

(73) Assignee: DENSO International America, Inc., Southfield, MI (US)

(*) Notice: Subject to any disclaimer, the term of this patent is extended or adjusted under 35 U.S.C. 154(b) by 0 days.

(21) Appl. No.: 16/112,292

(22) Filed: Aug. 24, 2018

(65) Prior Publication Data

US 2019/0061662 A1 Feb. 28, 2019

Related U.S. Application Data

(60) Provisional application No. 62/549,498, filed on Aug. 24, 2017.

(51) Int. Cl.
*B60R 19/52* (2006.01)
*B60K 11/08* (2006.01)

(52) U.S. Cl.
CPC .............. *B60R 19/52* (2013.01); *B60K 11/08* (2013.01); *B60R 2019/525* (2013.01)

(58) Field of Classification Search
CPC .... B60R 19/52; B60R 2019/525; B60K 11/08
USPC .............. 293/115, 117, 142; 296/193.1, 1.08
See application file for complete search history.

(56) References Cited

U.S. PATENT DOCUMENTS

| | | | |
|---|---|---|---|
| 7,726,428 B2* | 6/2010 | Kowalski | B62D 25/084 180/68.4 |
| 10,407,013 B1* | 9/2019 | Hernandez | B60R 19/52 |
| 2005/0029028 A1* | 2/2005 | Steinmacher | B60R 19/52 180/68.6 |
| 2012/0222837 A1* | 9/2012 | Lanfranco | F28F 19/002 165/67 |
| 2017/0021720 A1* | 1/2017 | Anderson | B60K 11/085 |

FOREIGN PATENT DOCUMENTS

CN 200974516 Y 11/2007

* cited by examiner

*Primary Examiner* — D Glenn Dayoan
*Assistant Examiner* — E Turner Hicks
(74) *Attorney, Agent, or Firm* — Harness, Dickey & Pierce, P.L.C.

(57) ABSTRACT

An engine cooling module having a radiator and a stone guard. The stone guard protects a core of the radiator from potential damage by foreign objects, such as stones.

17 Claims, 4 Drawing Sheets

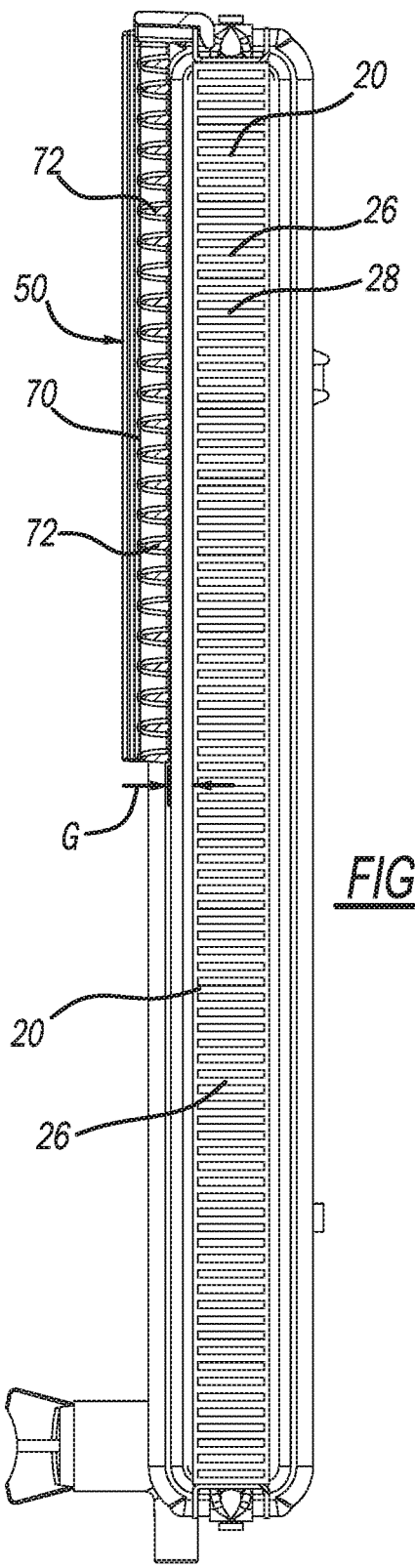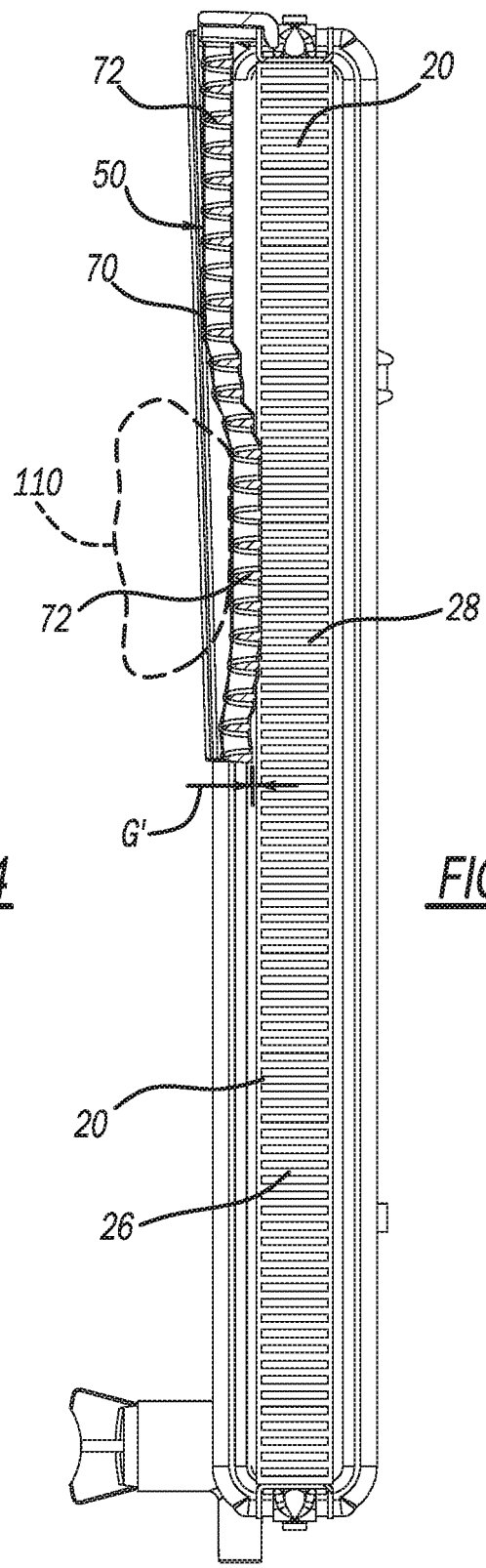

RADIATOR STONE IMPACT PROTECTIVE GUARD

CROSS-REFERENCE TO RELATED APPLICATIONS

This application claims the benefit of U.S. Provisional Application No. 62/549,498, filed on Aug. 24, 2018. The entire disclosure of the above application is incorporated herein by reference.

FIELD

The present disclosure relates to a radiator guard for protecting a radiator from being damaged by foreign objects, such as stones.

BACKGROUND

This section provides background information related to the present disclosure, which is not necessarily prior art.

Typical vehicles have a condenser at the front of an engine cooling module (ECM) stack. In contrast, many hybrid electric vehicles have a low temperature radiator (LTR) at a front of the ECM stack. While condensers are designed to withstand stone impact, current LTR's are not. The present disclosure advantageously includes an improved engine cooling module that provides numerous advantages over existing engine cooling modules as described herein, and as one skilled in the art will appreciate. For example, the present disclosure includes an improved ECM with an LTR at the front of the ECM stack that is able to withstand stone impact.

SUMMARY

This section provides a general summary of the disclosure, and is not a comprehensive disclosure of its full scope or all of its features.

The present disclosure includes an engine cooling module having a radiator and a stone guard. The stone guard protects a core of the radiator from potential damage by foreign objects, such as stones.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a cross-sectional view taken along line 4-4 of FIG. 2; and

FIG. 5 is the same view of FIG. 4, but shows the radiator stone guard absorbing impact of a foreign object, such as a stone, to protect a core of the radiator.

Corresponding reference numerals indicate corresponding parts throughout the several views of the drawings.

DETAILED DESCRIPTION

Example embodiments will now be described more fully with reference to the accompanying drawings.

Figure 1:
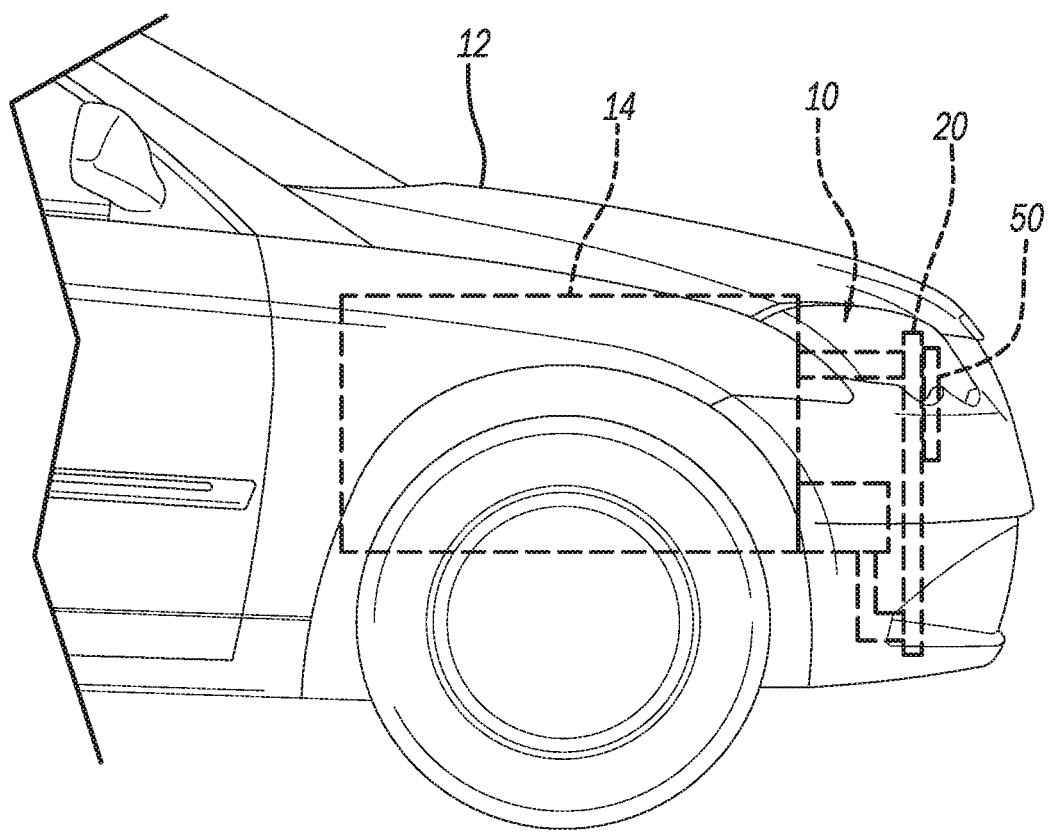
FIG. 1 illustrates an engine cooling system of an exemplary vehicle, the engine cooling system including a radiator stone guard in accordance with the present disclosure.

With initial reference to FIG. 1, an engine cooling module 10 in accordance with the present disclosure is illustrated as installed in an exemplary vehicle 12 to cool an engine 14 thereof. The vehicle 12 can be any suitable vehicle, such as any suitable plug-in hybrid electric vehicle (PHEV), or the vehicle 12 can include any suitable traditional combustion engine, such as any suitable gas turbo engine with which the engine cooling module 10 may be used to cool a water charge air cooler. Exemplary suitable PHEV vehicles include, but are not limited to, the following: passenger vehicles, recreational vehicles, utility vehicles, mass transit vehicles, construction vehicles/equipment, military vehicles/equipment, watercraft, aircraft, etc. The engine cooling module 10 may also be used to cool non-vehicular engines as well.

The engine cooling module 10 includes a radiator 20, through which is circulated any suitable coolant for cooling any suitable low temperature circuit. The coolant is also circulated through vehicle components, such as a turbocharger or electronic parts for example. The absorbed heat is radiated from the coolant as the coolant flows through the radiator 20. The coolant is then recirculated through the vehicle components to absorb heat for continuous cooling.

The radiator 20 is at a forwardmost end of the engine cooling module 10, and is thus subject to contact by foreign objects passing through a front of the vehicle 12 and/or through an undersurface of the vehicle 12. This arrangement of the radiator 20 is in contrast to many existing non-PHEV engine cooling modules, which have a condenser arranged at the forwardmost end of the engine cooling module. With such prior engine cooling modules, potential damage caused by foreign objects was less likely because condenser tubes are able to withstand impacts more effectively than radiator coolant tubes are. For example, condenser tubes are typically able to withstand five times more energy than radiator tubes. To protect the radiator 20, a stone guard 50 is included with the engine cooling module 10.

Figure 2:
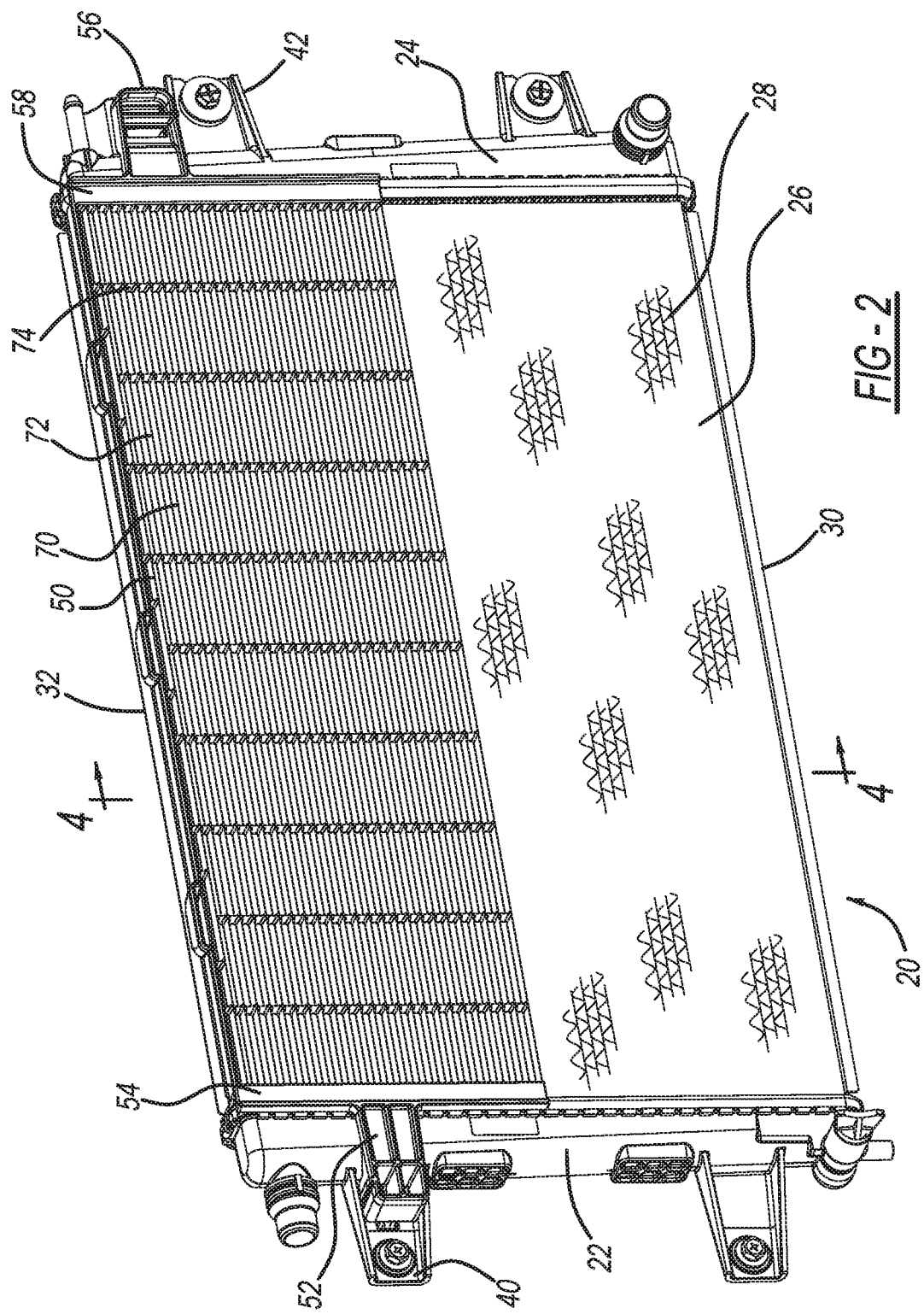
FIG. 2 is a perspective view of a radiator of the engine cooling system with the radiator stone guard mounted thereto.

With reference to FIG. 2, the radiator 20 includes a first tank 22 and a second tank 24. Between the first and second tanks 22 and 24 is a radiator core 26, which includes a plurality of coolant tubes 28. The core 26 includes a bottom end 30 and a top end 32. The coolant tubes 28 extend from the first tank 22 to the second tank 24 to transport engine coolant between the tanks 22 and 24. As the coolant is circulated through the coolant tubes 28, heat from the engine is radiated from the coolant.

The stone guard 50 includes a first bracket 52 at a first end 54, and a second bracket 56 at a second end 58. The first bracket 52 is mounted to a first radiator bracket 40 at the first tank 22, and the second bracket 56 is mounted to the second tank 24. A grid 70 of the stone guard 50 is suspended over the core 26 entirely by the first and second brackets 52 and 56 without any supports or stand-offs extending between the grid 70 and the core 26. In the example illustrated, the stone guard 50 is mounted such that it covers and protects the coolant tubes 28 proximate to the top 32 of the core 26, and leaves the coolant tubes 28 proximate to the bottom 30 of the core 26 exposed. This is because the coolant tubes 28 near the bottom 30 are protected from damage by foreign objects by other components of the vehicle 12. In some applications, however, the stone guard 50 may be enlarged to extend to the bottom 30 of the core 26 to protect the entire core 26.

Figure 3:
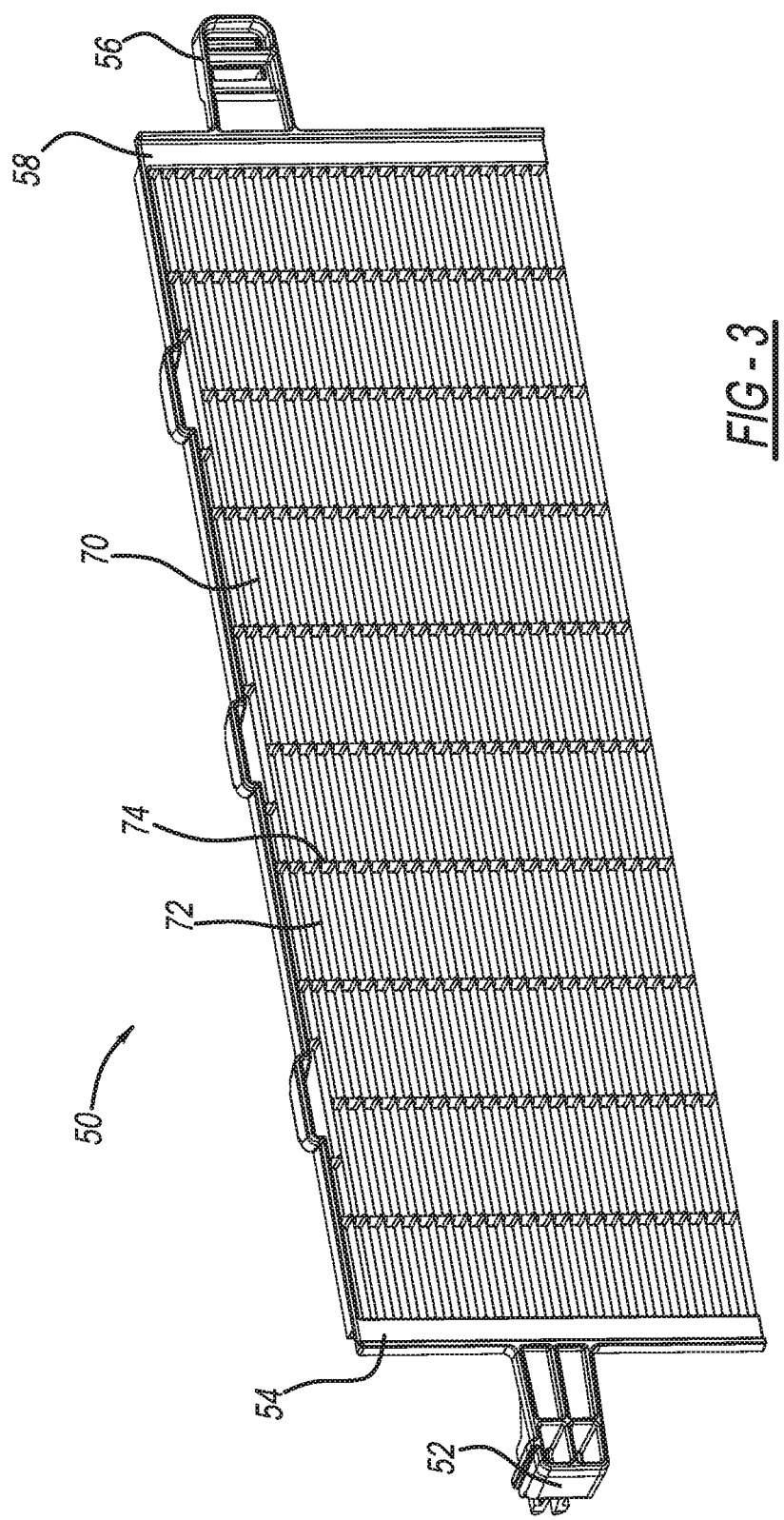
FIG. 3 is a perspective view of the radiator stone guard decoupled from the radiator.

With continued reference to FIG. 2 and additional reference to FIG. 3, the stone guard 50 further includes the grid 70 extending between the first end 54 and the second end 58. The grid 70 includes a plurality of horizontally extending members 72, and a plurality of vertically extending members 74. The horizontal members 72 and the vertical members 74 are arranged to define a plurality of slots, though which air can circulate to facilitate radiation of heat from coolant flowing through the coolant tubes 28. The slots are sized and shaped such that a foreign object, such as a stone, is likely to be blocked by the grid 70 from damaging the core 26 and the coolant tubes 28 thereof. The stone guard 50 may be made of any suitable material, such as any suitable polymeric material. Suitable polymeric materials include polypropylene, and any suitable glass-filled polymer.

With reference to FIG. 4, the stone guard 50 is mounted to the radiator 20 such that the grid 70 (and specifically the horizontal members 72 and the vertical members 74 thereof) are spaced apart from the coolant tubes 28 of the radiator core 26 to define a gap G between the grid 70 and the coolant tubes 28. The size of the gap G depends on the stiffness (i.e., flexibility) of the polymer from which the grid 70 is made. The grid 70 is advantageously provided with a stiffness, and the gap G is set, such that during normal operation of the vehicle 12 vibrations transferred to the stone guard 50 will result in the grid 70 flexing towards the core 26, but not contacting the core 26. Thus the stone guard 50 is formed of a polymeric material having a stiffness such that at a natural vibration frequency N of the stone guard 50, the grid 70 flexes towards the core 26 of the radiator 20, but does not contact the plurality of coolant tubes 28 of the core 26. The natural vibration frequency N may be, for example, greater than or equal to 26 Hz. The gap G may be, for example, 5 mm. The natural frequency (stiffness) of the grid 70 is above a primary forcing frequency of the vehicle 12 that the engine cooling module 10 is included with. The grid 70 flexes towards the core 26 of the radiator 20 and does not contact the plurality of coolant tubes 28 during normal operation of the vehicle 12.

Furthermore and with reference to FIG. 5, the stone guard 50 is provided with a stiffness such that when a foreign object (such as a stone 110) contacts the grid 70, the grid 70 flexes towards the core 26 to absorb the force exerted by the foreign object and protect the coolant tubes 28. When the force exerted by the foreign object is great enough, the grid 70 will flex to the core 26 and contact the core 26. This contact between the grid 70 and the core 26 advantageously enhances the impact resistance of the stone guard 50, while at the same time transfers only a minimal amount of impact force to the core 26, the impact force being insufficient to damage the core 26. Such a situation is illustrated in FIG. 5, where a foreign object in the form of the stone 110 has contacted the grid 70 and exerted a force upon the grid 70 sufficient to cause the grid 70 to flex inward and contact the core 26, thereby eliminating the gap G (illustrated in FIG. 5 at G') in the area where the impact of the stone 110 has taken place.

The present disclosure thus advantageously provides for a stone guard 50 for protecting a radiator 20 from impacts from foreign objects, such as stones 110. The stone guard 50 is mounted to the radiator 20 to define a gap G between grid 70 of the stone guard 50 and radiator core 26. The stone guard 50 is formed of a material having a stiffness/flexibility such that during normal operation of the vehicle 12, vibrations transferred to the stone guard 50 are insufficient to result in the grid 70 of the stone guard 50 contacting (and potentially damaging) the radiator core 26. The stiffness/flexibility of the stone guard 50 is also such that upon impact of a foreign object (such as stone 110) against the grid 70, the grid 70 will flex inward towards the radiator core 26 to absorb the impact energy. If the impact energy is above a predetermined threshold, the grid 70 will flex through the gap G and contact the core 26. The core 26 will provide support to the grid 70 to help absorb the impact of the stone 110 and prevent the grid 70 from being damaged. The gap G and the stiffness/flexibility of the grid 70 is such that the contact between the grid 70 and the radiator core 26 will not damage the radiator core 26. One skilled in the art will appreciate that the present disclosure provides numerous additional advantages and unexpected results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An engine cooling module comprising:
a radiator including a core having a plurality of coolant tubes, a first radiator bracket, and a second radiator bracket, the first radiator bracket and the second radiator bracket are configured to mount the radiator adjacent to an engine of a vehicle for cooling the engine; and
a stone guard directly mounted to the radiator with a first stone guard bracket and a second stone guard bracket both integral with the stone guard, the first stone guard bracket is mounted to the first radiator bracket, and the second stone guard bracket is mounted to the second radiator bracket, the stone guard including a grid having a plurality of first members and a plurality of second members extending perpendicular to the first members, an entirety of the grid is spaced apart from the core of the radiator such that no portion of the grid contacts the core.

2. The engine cooling module of claim 1, wherein the first members are horizontal and the second members are vertical.

3. The engine cooling module of claim 1, wherein the grid is suspended over the core without supports between the grid and the core.

4. The engine cooling module of claim 1, wherein the stone guard is made of a polymeric material.

5. The engine cooling module of claim 1, wherein the grid of the stone guard is flexible, and flexes towards the core when contacted by a foreign object.

6. The engine cooling module of claim 1, wherein the grid of the stone guard is flexible, and flexes to touch the core when contacted by a foreign object including a stone.

7. The engine cooling module of claim 5, wherein a natural vibration frequency (stiffness) of the grid of the stone guard is above a primary forcing frequency of a vehicle that the engine cooling module is included with, the grid flexes towards the core of the radiator and does not contact the plurality of coolant tubes during normal operation of the vehicle.

8. The engine cooling module of claim 7, wherein the natural vibration frequency of the grid is at least 26 Hz.

9. The engine cooling module of claim 1, wherein the stone guard extends across only an upper half of the core and does not extend to a lower half of the core.

10. The engine cooling module of claim 1, wherein the radiator cools a vehicle low temperature circuit.

11. The engine cooling module of claim 1, wherein the grid is spaced apart from the core of the radiator at a distance of about 3 mm to about 7 mm.

12. An engine cooling module for cooling an engine of a vehicle, the engine cooling module comprising:
a radiator including a core having a plurality of coolant tubes extending across the core; and
a stone guard directly mounted to the radiator, the stone guard including a grid that extends across the core of the radiator to protect the core from foreign objects, an entirety of the grid is spaced apart from the core to define a gap therebetween such that no portion of the grid contacts the core, a natural vibration frequency (stiffness) of the grid is above a primary forcing frequency of the vehicle that the engine cooling module is included with;
wherein:
the natural vibration frequency (stiffness) of the grid is such that during normal operation of the vehicle, vibrations transferred to the stone guard from the vehicle are insufficient to cause the grid of the stone guard to flex across the gap and contact the core of the radiator;
the natural vibration frequency (stiffness) of the grid is such that upon impact of a foreign object against the grid, the grid flexes inwards towards the core to absorb impact energy; and
the natural vibration frequency (stiffness) of the grid is such that when the impact energy exceeds a predetermined threshold, the grid flexes through the gap and contacts the core, the core is configured to support the grid to absorb impact of the foreign object.

13. The engine cooling module of claim 12, wherein the stone guard is made of a polymeric material.

14. The engine cooling module of claim 12, wherein the natural vibration frequency of the grid is at least 26 Hz.

15. The engine cooling module of claim 12, wherein the stone guard is mounted to the radiator such that the stone guard extends across only an upper half of the core and does not extend to a lower half of the core.

16. The engine cooling module of claim 12, wherein the grid is suspended over the core without supports between the grid and the core.

17. The engine cooling module of claim 12, wherein the engine cooling module is a hybrid electric vehicle engine cooling module.

* * * * *